Aug. 21, 1934.   L. B. GREEN   1,971,155
RADIATOR SHELL AND GRILLE ASSEMBLY
Filed May 26, 1933   3 Sheets-Sheet 1

Inventor:
Lee B. Green
by Albert Scheible
Attorney

Aug. 21, 1934.   L. B. GREEN   1,971,155
RADIATOR SHELL AND GRILLE ASSEMBLY
Filed May 26, 1933   3 Sheets-Sheet 2
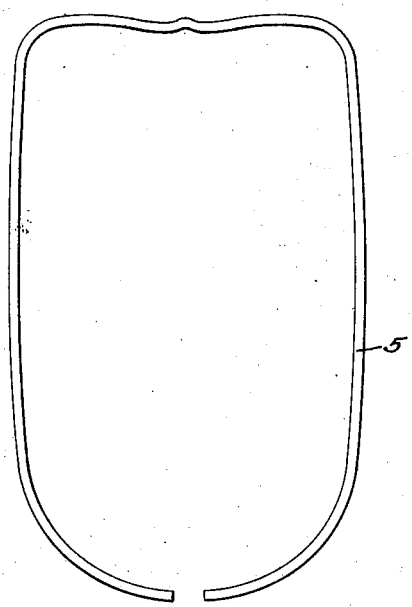
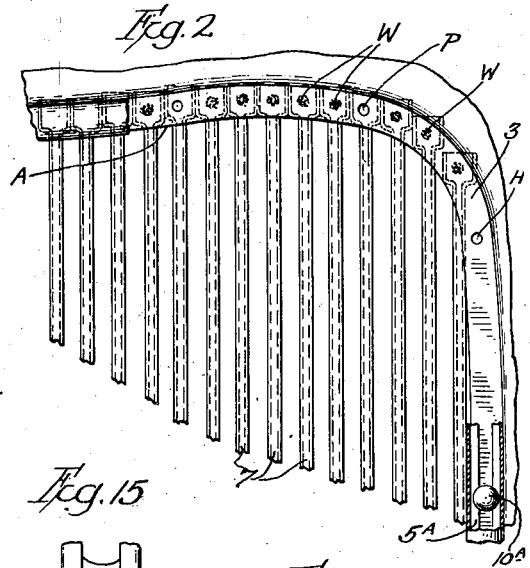
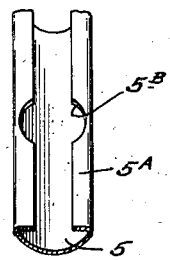
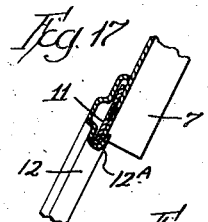
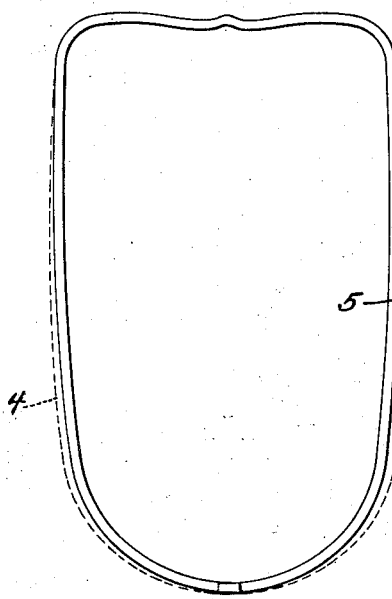
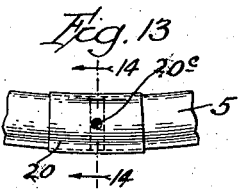
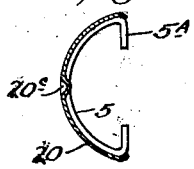
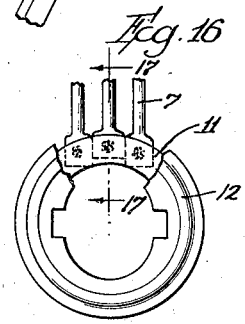
Inventor:
Lee B. Green
by Albert Scheibli
Attorney

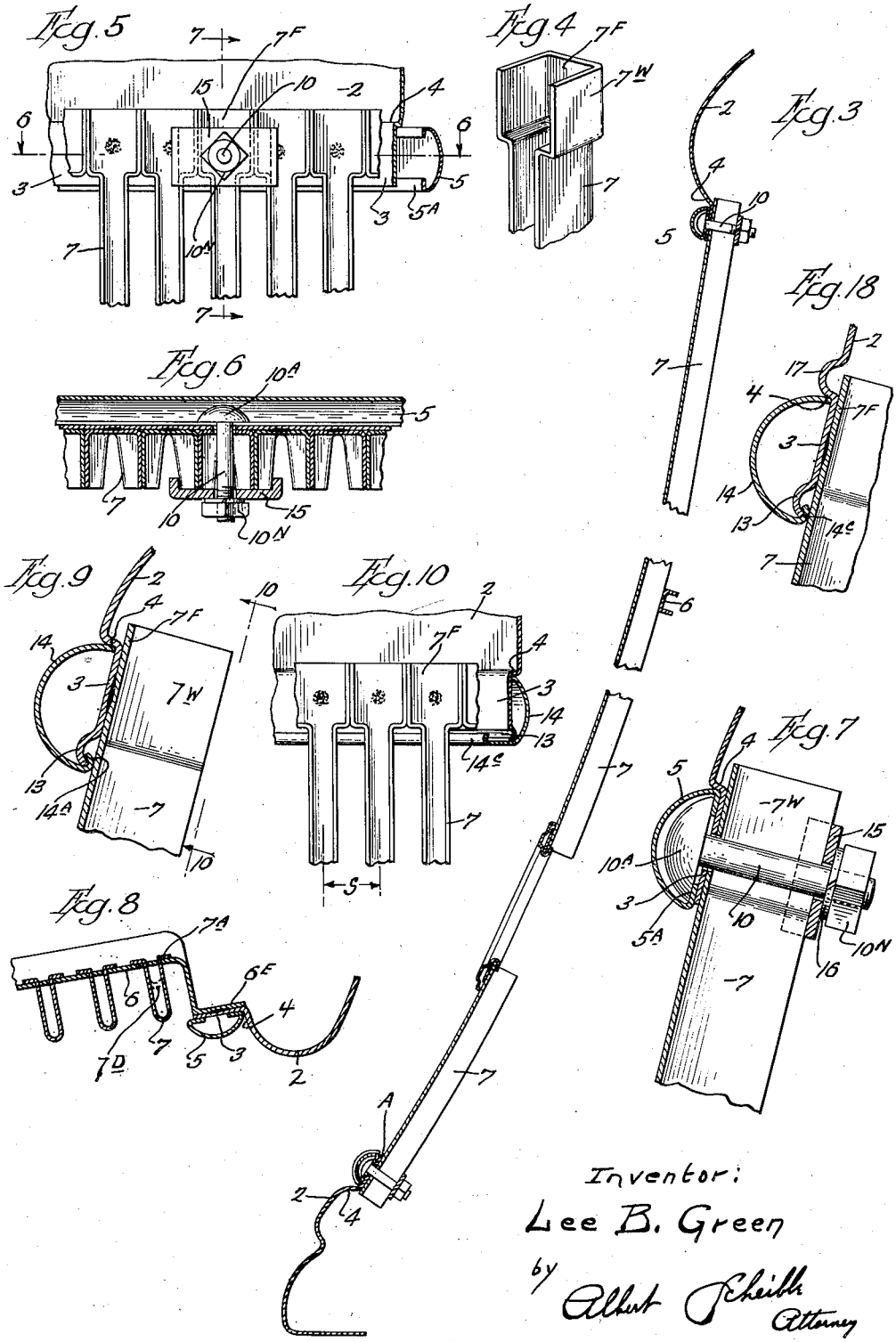

Patented Aug. 21, 1934

1,971,155

UNITED STATES PATENT OFFICE 1,971,155

RADIATOR SHELL AND GRILLE ASSEMBLY

Lee B. Green, Lakewood, Ohio

Application May 26, 1933, Serial No. 673,099

16 Claims. (Cl. 293—54)

My invention relates to radiator shell and parallel-bar grille assemblies for automobiles, and in its general objects aims to provide a grille and shell-front assembly which will be rigid even if the initially manufactured parts for it do not exactly conform in shape to one another, which will conceal any damaging of the parts caused by welding operations, and which will reduce the needed number of partly visible blade-connecting cross-bars.

In using parallel-blade grilles for guarding the air-admitting aperture in the front of an automobile radiator shell, the heretofore customary practices have shown the following disadvantages:

If the grille bars (or grille blades) are formed integral with the front of the radiator shell, a quite expensive new set of dies for the entire shell and blade assembly is required for every change in the spacing of the blades, for any change in the depth of the blades (at right angles to the general plane of the aperture spanned by these blades), or for a change in the contour of this aperture. Moreover, the depth of the blades (or width when viewed in side elevation) is limited by the consecutive spacing of the blades from each other, so that for many desirable blade spacings this blade depth cannot suffice for adequately concealing the radiator core behind the grille.

If the grille blades have their end portions welded to the rear faces of parts of the shell front, the welding operation mars and disfigures the appearance of the forwardly facing shell front parts to which the blades are welded; and with the thin metal commonly used for radiator shell fronts, such "flash spots" or other disfigurations cannot readily be ground off without unduly weakening the metal. Moreover, if the shell was plated before the blades are welded to it, the heat of the welding operation discolors parts of the plating so as to mar the appearance of the shell front.

To avoid the just recited objections to two general types of shell front and grille blade assemblies, many automobile manufacturers now use grilles assembled separately from the shell front and thereafter attached to the latter. Such separately constructed grilles usually consist of an upper and a lower blade-connecting cross-bar or tie-bar, and one or more additional cross-bars. Every one of these bars has to be fastened at each end to the shell, and the needed fastenings either show as disfigurations if the bar end portions were welded to the shell, or present fastening parts in front of the shell where they may not harmonize with the ornamental design of the radiator shell.

Moreover, in modern passenger automobiles, the apertured front face of the radiator shell is not flat, and the general frontal surface of the grille blade assembly also is far from flat. Indeed, in the higher price cars, it has become customary to provide a V-front effect by having the front edges of the blades at opposite sides of the vertical central plane of the grille lie in surfaces diverging from each other, and having the lower portions of the grille blades curve forwardly to an extent varying with the distances of the blades from the said plane.

With such non-planular fronts for both the shell and the grille blade assembly, the grille manufacturer has been expected to shape the peripheral portion of his grille to fit an assumed standard shape of the shell front. But in practice, irregularities in the manufacture of either the grille or the shell front prevent the ordered grilles from fitting uniformly against the shell front, so that the end portions of some of the grille blades (as for example the laterally outward ones) will be spaced from the shell front when the grille is fastened to the shell.

Owing to such spacing, a jarring of the car causes the freely spaced grille blades to slam intermittently against the shell front. Moreover, any change in the shape of the grille-front surface for the customary annual modification of the frontal appearance of the car requires an undesirably high cost for new tools and dies, and the providing of a large number of blade-connecting cross-bars also adds undesirably to the cost of the grilles.

My present invention aims to overcome all of the above recited objections, and in addition aims to provide a radiator shell front and a grille which can be speedily and cheaply assembled.

Illustrative of the manner in which I accomplish the advantageous objects of my invention, Fig. 1 is a front view of a radiator shell and grille assembly embodying my invention in which both the shell-front and the grille are of a V-front type curving forwards downwardly and in which a moulding for concealing defigurations due to the welding is bolted to the shell-front, with a part of this moulding and also edge portions of the radiator shell broken away.

Fig. 2 is an enlargement of an upper right-hand portion of Fig. 1, with the blade portions behind the shell-front shown in dotted lines, and with all except a relatively short portion of the weld-mark-concealing moulding broken away.

Fig. 3 is an enlarged and fragmentary vertical section taken along the line 3—3 of Fig. 1.

Fig. 4 is an enlarged rear perspective view of the upper end of one of the grille blades.

Fig. 5 is an enlarged rear elevation of portions of the same radiator shell and grille assembly adjacent to the upper edge of the air-admitting aperture.

Fig. 6 is a horizontal section taken along the line 6—6 of Fig. 5.

Fig. 7 is a still more enlarged horizontal section taken along the line 7—7 of Fig. 5.

Fig. 8 is an enlarged horizontal section taken along the line 8—8 of Fig. 1.

Fig. 9 is a section allied to Fig. 7, but showing part of an embodiment of my invention in which the weld-mark-concealing or finishing moulding is snapped on to the shell-front instead of being attached by bolts.

Fig. 10 is a fragmentary rear view of the embodiment of Fig. 9 but drawn on a reduced scale.

Fig. 11 is an elevation of the main portion of the finishing moulding of either of the above mentioned two embodiments, drawn on a reduced scale and showing it as initially manufactured.

Fig. 12 is an elevation of the same main moulding strip as it appears when compressed and with its free ends overlapping to permit its convenient attaching to the shell-front.

Fig. 13 is an enlarged front elevation of the central lower portion of the finishing moulding after the two strip ends have been connected by an auxiliary moulding clip which conceals the gap between the strip ends.

Fig. 14 is a still more enlarged vertical section taken along the line 14—14 of Fig. 13.

Fig. 15 is an enlarged rear elevation of a portion of the finishing moulding of Figs. 1, 2, 5 and 6, showing one pair of the moulding-flange recesses which permit a convenient inserting of a bolt-head into the interior of the flange.

Fig. 16 is an enlarged and fragmentary elevation of the assemblage of parts at the opening in the grille which admits a hand-crank.

Fig. 17 is a still more enlarged vertical section taken along the line 17—17 of Fig. 16.

Fig. 18 is a section similar to a portion of Fig. 9, showing the use of a mere bead on the shell-front between the annular blade-engaged shell-front portion and shell-front portion radially outward thereof, with the said two portions in a common plane.

Figure 1:
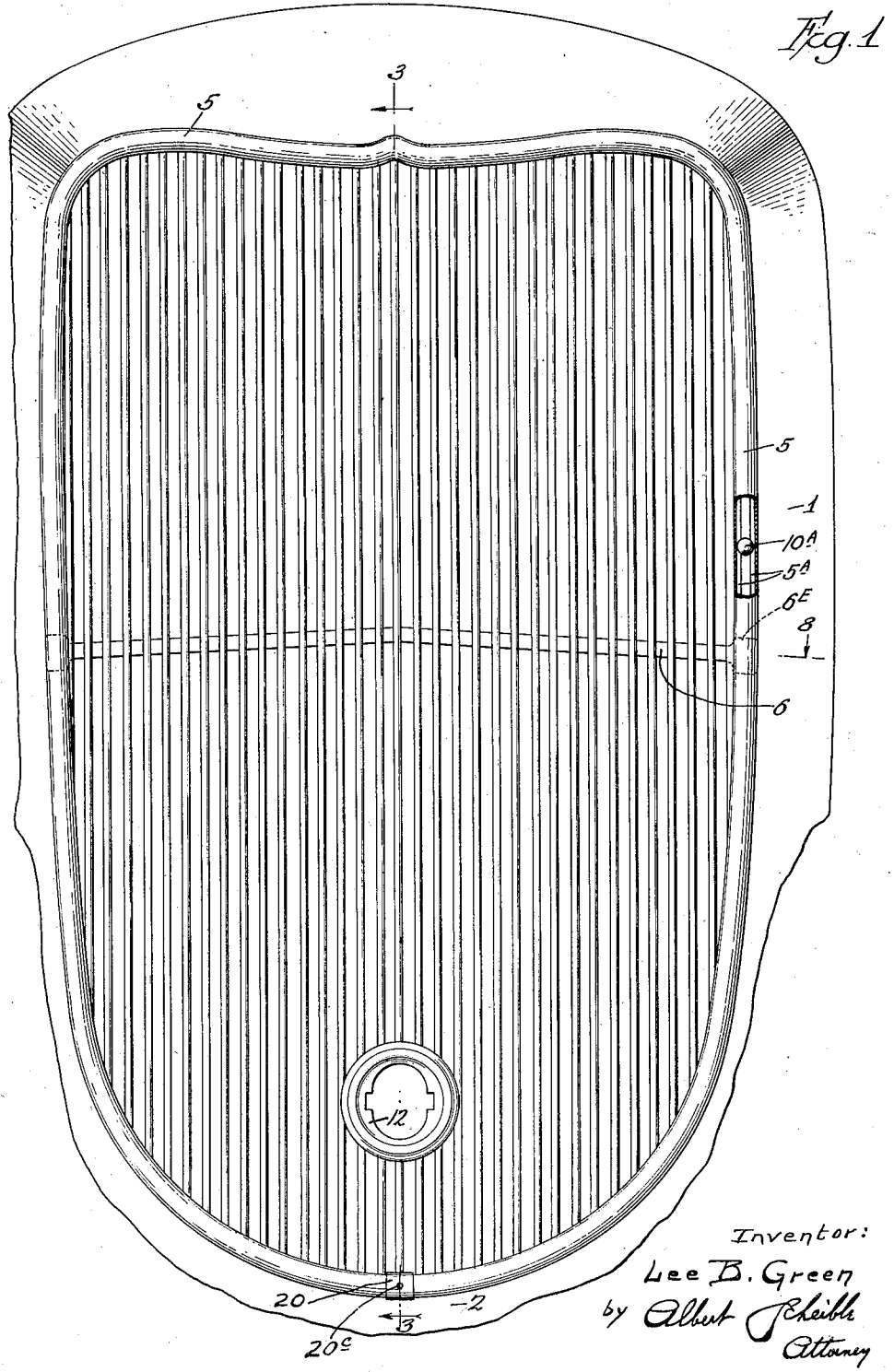

In general, my invention is based on the following discoveries and observations, which also form part of the basis for my said companion application on "Assembling radiator-shell and grille units":

(1) That a single blade-connecting cross-bar (hereafter called tie-bar) is sufficient for imparting rigidity to the grille if the end portions of each grille blade are welded directly to the shell-front.

(2) That such a single tie-bar, if fastened to each blade, and if formed to correspond with the horizontal section through the frontal surface of the grille at the height at which this bar is disposed, will permit a sufficient springing of each blade (in a plane longitudinal of the blade and at right angles to the general plane of the shell-front aperture) to permit every blade end portion to bear against the rear of the shell-front.

(3) That the defigurations in the shell-front caused by then welding the end portions of the blades to the shell-front can readily be concealed by a finishing moulding attached to the shell-front after the tie bar and the blade end portions have been welded to this shell-front.

(4) That the shell-front can readily be formed so as to afford an annular shoulder for accurately positioning the moulding with respect to the aperture in this shell-front.

(5) That the finishing moulding can be cheaply formed from a single moulding strip the ends of which can afterwards be connected by a simple moulding clip without requiring auxiliary fastening means.

(6) And that the finishing moulding can readily be secured to the shell-front either by entirely concealed bolts, or by so forming this moulding that it can be firmly snapped upon the aperture-bordering portion of the shell-front without requiring the use of bolts or other fastening members.

In Figs. 1, 2 and 3, the radiator shell includes a rearwardly open peripheral flange 1 and an apertured shell-front 2 which presents an annular blade-engaging flange (or "welding flange") 3 of straight-edged cross-section and uniform width, this flange being offset rearwardly from the adjacent shell-front portion by an annular shoulder 4 against which the peripheral edge of the finishing (or weld-mark-concealing) moulding 5 can engage.

Extending across the air-admitting aperture A in the shell-front, desirably somewhere near the mid-height of this aperture, is a tie-bar, shown in Figs. 3 and 8 as a channel-sectioned bar presenting the outer face of its channel-back 6 forwardly and having this channel flattened out at each end of the tie-bar to present flat bar ends bearing flatwise against the rear face of the blade-engaging annular flange 3. This channel-back is provided, after the manner shown in my copending application #646,160, with spaced pairs of slots, for cooperation with tabs projecting rearwardly from the webs of the blades 7.

Each grille blade, as here shown, consists of a rearwardly open sheet metal channel-bar having a uniform U-section for the main portion 7 of the blade which extends across the aperture A in the shell-front, and presenting flat channel-backs 7F in the end portions of the blade, the channel webs 7W in these blade-end portions being spread farther apart than in the said main portion of the blade (as in Fig. 4) to permit the convenient entry of a welding electrode between them.

With the tie-bar 6 and the blades thus constructed, and with the tabs 7A formed on each blade at the height at which the tie-bar is to cross the blade, the blades can first be fastened to the tie-bar by sliding the tabs 7A of each blade through the proper slots in the tie-bar and thereafter clinching these tabs against the rear face of the channel-back 6 of the tie-bar. This definitely spaces the blades from each other approximately at their mid-height, disposes the blades approximately parallel to one another, and also prevents them from shifting vertically with respect to the tie-bar. If the width of each blade-end is equal or almost equal to the spacing S (Fig. 10) between two consecutive blades, so that these blade ends engage each other as also shown in Figs. 5 and 6, this also tends to dispose all of the blades at least approximately in their desired relative positions.

With the resulting grille-blade and tie-bar assembly then positioned within the shell, the flat ends 6E of the tie-bar can speedily be welded to the rear face of the shell-front flange 3, so as to anchor both the tie-bar and the blade-portions which cross this bar in definite relation to the radiator shell. When the ends of each blade are then being welded respectively to upper and lower portions of the shell-front flange 3, the resiliency of each blade (if made according to the usual practice of somewhat resilient steel or the like) will permit it to flex (in the plane of the drawing in Fig. 3) so as to allow each flat channel-back 7F (Figs. 4 to 6) to bear flatwise against the rear face of the said flange 3, thus compensating for any departures in the formation of either the blades or the radiator shell from the intended standard shapes.

In practice, this spot-welding of all of the blade ends to the said blade-engaging flange can be done quite speedily and inexpensively, thereby eliminating the cost of the heretofore employed upper and lower end bars (or even a complete frame) on such grilles, and also eliminating the cost and the occasionally insecurity of the means for bolting or otherwise fastening such auxiliary end bars to the grille blades. In addition, I entirely avoid both the unsightly appearance and the rattling which so often occurs when such upper and lower end bars on grilles are not formed for exactly fitting against the shell-front, and likewise avoid the unsightliness of having grille blades spaced rearwardly from the adjacent portions of the shell-front. Moreover, since the grille cannot shift in its own general plane with respect to the radiator shell, after the manner of a grille having end bars loosely bolted to such a shell, I enhance the rigidity of the assembly to such an extent that a single tie-bar (as shown in Fig. 1) suffices for cross-connecting the blades even in a relatively tall grille.

However, the spot-welding of the blade ends to the shell-front 3 leaves decided disfigurations W (Fig. 2) on the front of this flange. To conceal these, I provide moulding portions fastened to the shell-front in front of these roughened, discolored or otherwise disfigured flange parts. And, since strips of moulding extending merely along the upper and lower edges of the shell aperture A would not afford an artistic appearance, I preferably form this moulding as a frame entirely bordering the front of the said aperture.

For this purpose, I desirably employ a strip of moulding first formed to a forwardly convexed cross-section and then bent to constitute a frame, the outer edge of which frame will fit snugly against the annular shoulder 4 (Figs. 3 and 7) on the shell-front. And instead of employing a rigid frame, I preferably make this frame of such an initial shape and resiliency as to expand against the said annular shoulder when positioned on the shell-front.

When the finishing moulding is to be bolted to the radiator shell, I desirably make this moulding of the cross-section shown in Figs. 5 and 15, so that the moulding has a forwardly convexed main portion 5 medial of its width, and has the longitudinal edges of the metal strip from which it was formed recurved toward each other to present flanges 5A having their rear faces in a common plane. Then I employ bolts having shanks 10 (Fig. 6) of less diameter than the gap between the said flanges and having heads 10A adapted to enter the space between the said flanges and the main moulding portion 5 through pairs of opposed recesses 5B (Fig. 15) in the said flanges.

When using grille blades having their adjacent ends contiguous or otherwise closely spaced, I bore certain of the bolt-receiving perforations both through blade-end portions 7F and through the shell flange portion 3 engaged by these blade ends, and punch additional bolt-receiving perforations H merely in the upright portions of that shell flange which connect its upper and lower blade-engaging portions. Then I interpose clamp-pieces 15 between the nut 10N of each bolt and the rear edges of the blade webs 7W across which each clamp-piece extends, thereby distributing the pressure so that a tightening of the bolts will not deform the blade webs engaged by the clamp-piece.

With the edge recesses 5B in the flanges of the moulding disposed at convenient points between the parts of these flanges which are to be adjacent to the bolt-shank receiving perforations in the shell-front, the bolt heads can readily be slipped into the moulding from the rear of the latter to facilitate the attaching.

With the heretofore described bolt-attached finishing moulding, the moulding can be replaced by a new moulding when the original one is damaged, by detaching the nuts and clamp-pieces and then prying off the old moulding and drawing out the main bolt portions with this moulding.

However, my invention can also be employed, and at less cost, without the use of any bolts, by forming the moulding so that it will hook or snap directly upon the shell-front portion adjacent to the air-admitting aperture A. For this purpose, I desirably form the annular shell-front portion 3 (Figs. 9 and 10) contiguous to the said aperture into a forwardly convexed bead presenting its free edge forward from the plane of the rear face of the blade-engaging shell-front flange 3. Then I recurve the inner edge of the moulding 14 to form a hooking flange 14C which can be snapped into engagement with the said bead.

To facilitate the attaching of such a snap-on moulding I initially form the frame like moulding 5 so that its vertical members will spread farther apart than the generally upright portions of the said shoulder 4, and so that the free ends of the moulding strip at the bottom of the incomplete frame will spread considerably apart, as in Fig. 11. During the attaching, the frame first is laterally compressed (with its free ends overlapping as in Fig. 12) while the top frame member is hookingly attached to the generally horizontal upper portion of the shell-front flange 3. I thereafter snap the other moulding parts also upon the said flange. Then I conceal the still remaining slight gap between ends of the moulding strip by a clip 20 (Figs. 13 and 14) which may be of quite thin metal, and indent this clip (as at 20C) between the two strip ends to prevent the clip from sliding out of its gap-concealing position.

This snap-on moulding also can easily be replaced if desired, by prying off the clip 20 and thereafter reversing the attaching operation.

With both of the above described embodiments of my invention, my welding of the blades directly to the shell does not interfere with the convenient providing of means for admitting a hand-crank through a lower portion of the grille. For this purpose, the grille blades which extend across and adjacent to the needed opening are made in alined sections, with their ends welded (as in Fig. 16) to a flat annular plate 11 upon which an annular cover 12 is thereafter snapped as shown in Fig. 17. In practice, the plate 11 can be attached to the corresponding two-sectioned blades either before or after these blades are attached to the tie-bar 6; since the free ends of these blades then still are relatively free, each thereof can be flexed independently (if necessary) to fit firmly against the shell-front flange 3 to which it is welded.

By using grille blades which are separately formed from the radiator shell front and yet welded to the latter so as to be effectively integral with that front, I can employ blades of much greater depth than is possible when the blades and the shell-front are formed from a single sheet of metal. For example, it will be evident from Fig. 10, that the material available for the main portion of each blade if formed from the same sheet with the shell-front could only have a maximum width corresponding to the blade-center spacing S, so that each blade (if its webs spread apart as in Fig. 8) could only have the depth indicated by the dotted lines 7D in that figure. Consequently, I greatly increase the rigidity of the grille to prevent having stones or the like impacted against the radiator core behind the grille, and also greatly enhance the concealing of this core by the grille.

Moreover, I effect many important savings in the manufacturing cost. For example, when the blades are formed integral with the shell-front from a single piece of steel, the cost of the dies is much greater than the joint cost of the dies for the shell and blades of my here presented grille, and any tearing or damaging of even a single blade will require the entire punching to be scrapped or mended at considerable cost.

In addition, by employing a separately formed finishing moulding which can be chrome-plated at relatively low cost and attaching this to a merely nickel-plated (or otherwise coated) shell-front, I can secure a highly ornamental frontal finish at a decided saving in cost. So also, changes in the spacing, depth, and to some extent also in the side-elevation of the blades can be made with a quite low tool cost without requiring a new die for the radiator shell.

However, while I have heretofore described my invention in connection with embodiments including desirable details of construction and arrangement, I do not wish to be limited in these respects, since many changes might be made without departing either from the spirit of my invention or from the appended claims. For example, Figs. 5 and 9 show the blade-engaging flange 3 as rearwardly offset so that the connection of this flange to the adjacent shell-front portion will afford the annular shoulder 4, but this moulding engaged shoulder may be provided in other ways. Thus, Fig. 18 shows the shell-front as having a mere bead 17 affording the shoulder 4 while leaving the blade-engaging flange 3 flush with the part 2 of the shell-front at the other side of this bead.

So also, while I have partly recited a procedure for assembling the shell-front, blades and weld-mark concealing means, I do not wish to be limited in these respects, and particularly since a more complete disclosure of a commercially advantageous assembling procedure will be found in my said companion application. Nor do I wish to be limited to the use of my invention in connection with grilles and grille framing members designed for use on automobiles.

I claim as my invention:

1. The combination with a radiator shell-front having an air-admitting aperture, and formed to present an annular forwardly directed shoulder concentric with the said aperture; of a grille comprising grille elements extending behind the shell-front and welded to shell-front portions between the aperture and the said shoulder; and an annular finishing member composed of resilient material supported in front of the part of the shell-front between the said aperture and shoulder so as to conceal disfigurations in the shell-front resulting from the welding operation, the said member having its periphery engaging the said shoulder.

2. The combination with a radiator shell-front having an air-admitting aperture, and formed to present an annular forwardly directed shoulder concentric with the said aperture; of a grille comprising elements extending behind the shell-front and welded to shell-front portions between the aperture and the said shoulder; and weld-mark-concealing means comprising an incompletely annular moulding bearing against the front face of the part of the shell-front between the said aperture and shoulder, and a clip or the like connecting the free ends of the incompletely annular moulding and concealing the gap between the ends of the said moulding.

3. The combination with a radiator shell-front having an air-admitting aperture, and formed to present an annular forwardly directed shoulder concentric with the said aperture; of a grille comprising elements extending behind the shell-front and welded to shell-front portions between the aperture and the said shoulder; and an annular and resilient finishing member engaging the forward face of the part of the shell-front between the said aperture and shoulder, the said member having its periphery engaging the said shoulder and having its radially inner edge portion in hooking engagement with the part of the shell-front contiguous to the said aperture.

4. In combination, radiator shell-front provided with an air-admitting aperture and having the said aperture bordered by an annular shell-front portion offset rearwardly from the adjacent part of the shell front; a grille comprising blades having their end portions welded to the rear face of the said annular shell-front portion, the grille also including a blade-connecting bar extending transversely of the blades and having its end portions fastened to the rear face of the said annular shell-front portion; and an annular finishing member extending in front of and clamped against the forward face of the said annular portion.

5. A combination of a radiator shell front, grille, and finishing member as per claim 4, in which the finishing member corresponds substantially in width to the said annular shell-front portion.

6. A combination of a radiator shell front, grille, and finishing member as per claim 4, in which the finishing member has its longitudinal edge portions recurved behind the intermediate part of the finishing member to present flanges bearing against the said rearwardly offset portion.

7. A combination of a radiator shell front, grille, and finishing member as per claim 4, in which the finishing member has its longitudinal edge portions recurved behind the laterally medial part of the finishing member and has the said intermediate part of a forwardly convexed arcuate transverse section.

8. A combination of a radiator shell front, grille, and finishing member as per claim 4, in which the shell-front presents an annular shoulder connecting the said rearwardly offset front portion with the forwardly facing shell-front part outward thereof, and in which the annular finishing member has its peripheral edge engaging the said shoulder.

9. A combination of a radiator shell front, grille, and finishing member as per claim 4, in which the finishing member comprises a strip of moulding bent to an annular frame-like shape corresponding in the shape of its bore to the shape of the said aperture, the said strip presenting spaced ends; and a relatively short strip of moulding overlapping the said strip ends and concealing the gap between the said ends.

10. The combination with a radiator shell front having an air-admitting aperture, of a grille comprising blades spanning the said aperture and having end portions of the blades welded to rear face portions of the shell front adjacent to the said aperture; an annular finishing member bearing against the forward face of the shell-front portion bordering the aperture and concealing the shell-front parts to which the blades are welded, and bolt members extending through the said shell-front portion and clamping the finishing member against the shell-front.

11. A radiator shell front, grille and finishing member assemblage as per claim 10, in which each bolt member includes a clamp-plate extending behind and engaging the rear edges of a plurality of the blades.

12. A radiator shell front, grille and finishing member assemblage as per claim 10, in which each bolt presents its head in front of shell-front portion bordering the said aperture and behind a part of the finishing member, and in which the finishing member has a longitudinal edge portion thereof recurved and clamped between the bolt heads and the said shell-front portion.

13. The combination with a radiator shell front having an air-admitting aperture, of a grille comprising blades spanning the said aperture and having end portions of the blade welded to rear face portions of the shell front adjacent to the said aperture; and weld-mark concealing means comprising an annular moulding extending in front of the parts of the shell-front to which blade-end portions are welded, the said moulding having its inner edge recurved and in hooking engagement with portions of the shell front adjacent to the said aperture.

14. The combination with a radiator shell-front having an air-admitting aperture, of a grille comprising blades spanning the said aperture and having end portions of the blades spot-welded directly to rear face portions of the shell-front adjacent to the said aperture; and weld-mark concealing means mounted on the shell-front and extending in front of the parts of the shell-front to which the said blades are welded; the shell-front having an annular bead of forwardly convexed cross-section bordering the said aperture, the said weld-mark concealing means comprising an annular moulding having its inner edge recurved and in hooking engagement with the inner edge part of the said bead.

15. The combination with a radiator shell-front formed of sheet metal and having an air-admitting aperture, of a grille comprising substantially upright blades spanning the said aperture, the said blades having their upper and lower end portions extending respectively behind parts of the said shell front adjacent to the top and the bottom of the said aperture, and each blade having each end portion thereof spot-welded directly to the rear face of the shell-front part behind which that end portion extends; and a separately constructed annular finishing member conforming in its interior contour to the bore of the said aperture, and supported in rearward engagement with the said shell front; the said finishing member having its upper and lower parts respectively extending in front of the parts of the shell-front to which the upper and the lower end portions of the blades are welded, whereby the said member conceals the weld-marks on the shell-front produced by the said welding of blade-end portions to the said shell-front.

16. In combination, a radiator shell-front provided with an air-admitting aperture and having the said aperture bordered by an annular shell-front portion offset rearwardly from the adjacent part of the shell-front; a grille comprising substantially parallel blades having their end portions spot-welded directly to the rear face of the said annular shell-front portion, the grille also including a blade-connecting bar extending transversely of the blades and having its end portions spot-welded to the rear face of the said annular shell-front portion; and a separately constructed annular finishing member attached to the said shell-front independently of the welding of both the blades and the tie-bar to the shell front; the said finishing member extending around the said aperture and in front of all of the shell-front portions to which the blades and the tie-bar are welded, so as to conceal the weld-marks produced on the shell-front by the said welding.

LEE B. GREEN.